United States Patent [19]
Nakamoto

[11] Patent Number: 6,097,138
[45] Date of Patent: Aug. 1, 2000

[54] FIELD EMISSION COLD-CATHODE DEVICE

[75] Inventor: Masayuki Nakamoto, Chigasaki, Japan

[73] Assignee: Kabushiki Kaisha Toshiba, Kawasaki, Japan

[21] Appl. No.: 08/933,039

[22] Filed: Sep. 18, 1997

[30] Foreign Application Priority Data

Sep. 18, 1996 [JP] Japan .................................. 8-246436
Sep. 18, 1996 [JP] Japan .................................. 8-246440

[51] Int. Cl.$^7$ ........................................................ H01J 1/30
[52] U.S. Cl. ..................... 313/309; 313/311; 313/497; 313/336; 313/351
[58] Field of Search ................................... 313/495, 496, 313/497, 309, 336, 351, 346 R

[56] References Cited

U.S. PATENT DOCUMENTS

| | | | |
|---|---|---|---|
| 5,747,926 | 5/1998 | Nakamoto et al. ................. | 313/336 X |
| 5,773,921 | 6/1998 | Keesmann et al. ................. | 313/309 |
| 5,786,656 | 7/1998 | Hasegawa et al. ................. | 313/336 X |
| 5,818,153 | 10/1998 | Allen .................................. | 313/336 X |
| 5,831,378 | 11/1998 | Rolfson et al. .................... | 313/336 |
| 5,973,444 | 10/1999 | Xu et al. ............................. | 313/309 |

OTHER PUBLICATIONS

C.A. Spindt, et al., "Physical Properties of Thin–Film Field Emission Cathodes with Molybdenum Cones", Journal of Applied Physics, vol. 47, No. 12, Dec. 1976, pp. 5248–5263.

Sumio Iijima, "Helical Microtubules of Graphitic Carbon", Nature, vol. 354, Nov. 7, 1991, pp. 56–58.

T.W. Ebbesen, et al., "Large–Scale Synthesis of Carbon Nanotubes", Nature, vol. 358, Jul. 16, 1992, pp. 220–222.

*Primary Examiner*—Ashok Patel
*Attorney, Agent, or Firm*—Oblon, Spivak, McClelland, Maier & Neustadt, P.C.

[57] ABSTRACT

A field emission cold-cathode device includes a support member and a plurality of emitters formed on said support member to emit electrons. Each emitter is made up of a plurality of carbon nanotubes basically constituted by an array of 6-membered rings of carbon. 70% or more of all of the carbon nanotubes have diameters of 30 nm or less. An aspect ratio representing the ratio of the height to the bottom diameter of the carbon nanotube forming the emitter is set at from 3 to $1\times10^3$. The period of the 6-membered rings of carbon in the carbon nanotube is a multiple of 0.426 nm or 0.738 nm.

21 Claims, 13 Drawing Sheets

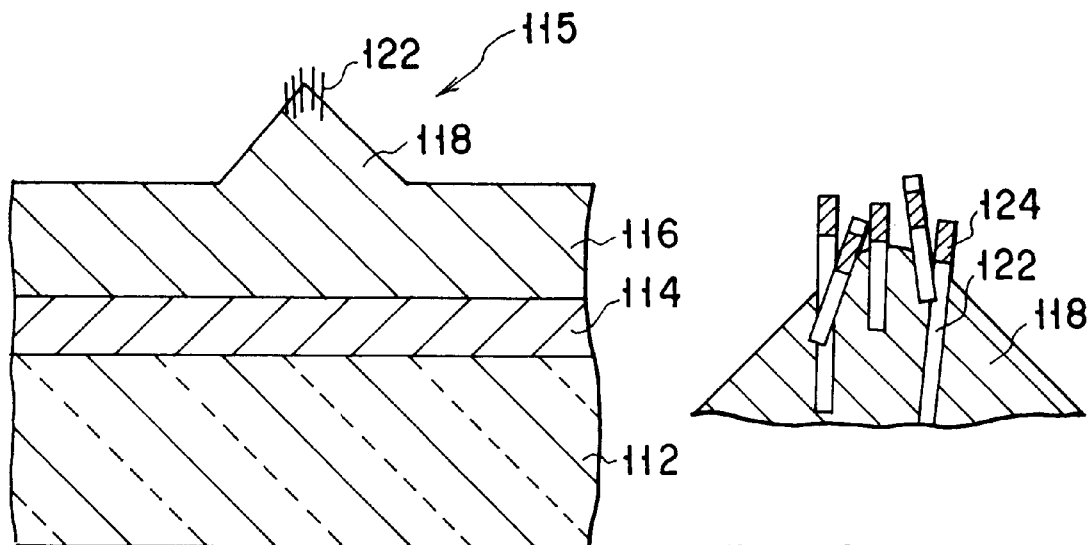
FIG. 11A
FIG. 11B
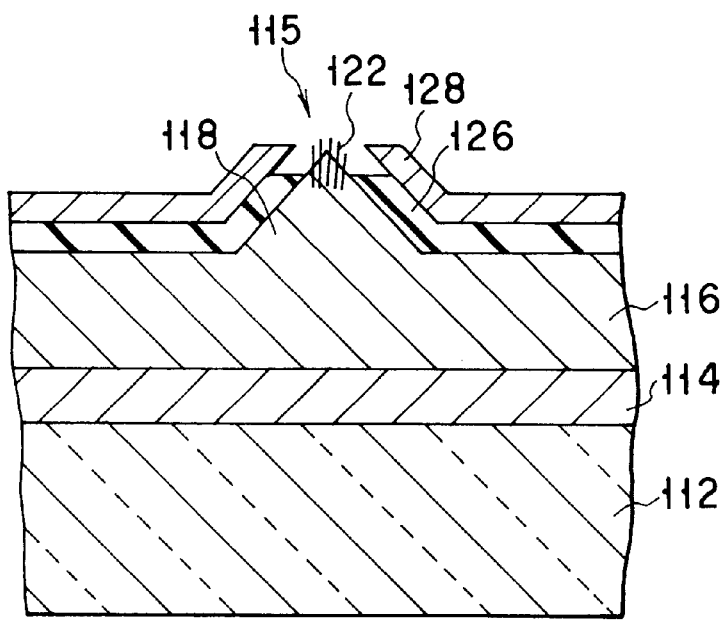
FIG. 12

FIELD EMISSION COLD-CATHODE DEVICE

BACKGROUND OF THE INVENTION

The present invention relates to a field emission cold-cathode device, a method of manufacturing the cold-cathode device, and a vacuum micro device using the cold-cathode device.

Recently, field emission cold-cathode devices using semiconductor processing technologies are being actively developed. As one representative example, a device described by C. A. Spindt et al. in Journal of Applied Physics, Vol. 47, 5248 (1976) is known. This field emission cold-cathode device is manufactured by forming an $SiO_2$ layer and a gate electrode layer on an Si single-crystal substrate, forming therein a hole having a diameter of about 1.5 $\mu$m, and forming a conical emitter for performing field emission in this hole by vapor deposition. A practical manufacturing method of this device will be described below with reference to FIGS. 17A to 17C.

First, an $SiO_2$ layer 2 as an insulating layer is formed on an Si single-crystal substrate 1 by a deposition method such as CVD. Subsequently, an Mo layer 3 as a gate electrode layer and an Al layer 4 to be used as a sacrificial layer are formed on the $SiO_2$ layer 2 by, e.g., sputtering. A hole 5 having a diameter of about 1.5 $\mu$m is then formed in the layers 2, 3, and 4 by etching (FIG. 17A).

Subsequently, a conical emitter 7 for performing field emission is formed in the hole 5 by vapor deposition (FIG. 17B). The formation of this emitter 7 is done by vertically depositing a metal such as Mo as the material of the emitter onto the rotating substrate 1 in a vacuum. During the deposition, a pinhole diameter corresponding to the aperture of the hole 5 decreases as an Mo layer 6 is deposited on the Al layer, and finally becomes 0. Therefore, the diameter of the emitter 7 deposited in the hole 5 through the pinhole also gradually decreases to form a conical shape. The excess Mo layer 6 deposited on the Al layer 4 is removed later (FIG. 17C).

Unfortunately, the above manufacturing method and the field emission cold-cathode device manufactured by the method have the following problems.

First, the emitter is formed by a rotational deposition method in which the diameter of the pinhole corresponding to the aperture of the hole 5 gradually decreases. For this reason, the height of the emitter and the shape of the tip of the emitter vary, and this degrades the uniformity of field emission. Additionally, the reproducibility of the shape and the yield are low. This extremely increases the production cost in manufacturing a large number of field emission cold-cathode devices having uniform characteristics on a single substrate.

Further, since the tip of the emitter necessary to improve the field emission efficiency is lacking sharpness, the driving voltage is increased. This poses problems such as a reduction in the field emission efficiency and an increase in the consumption power. When a high driving voltage is used, the shape of the emitter tip readily changes under the influence of a residual gas ionized by this voltage. This also raises problems in terms of reliability and service life.

Furthermore, since the $SiO_2$ insulating layer is formed to be thick by CVD, it is impossible to accurately control the gate-to-emitter distance which has a large influence on the field emission efficiency. This degrades the uniformity of field emission and produces variations. Also, the shorter the gate-to-emitter distance, the lower the voltage by which the element can be driven. However, it is difficult to bring the gate and the emitter close to each other with a high controllability.

Moreover, because of the properties of the manufacturing method, the ratio of the height to the base length of the emitter, i.e., the aspect ratio of the emitter is difficult to increase to 2 or more. As the aspect ratio of the emitter rises, an electric field is more concentrated to the tip of the emitter. For this reason, a high aspect ratio has a great effect of decreasing the driving voltage and the consumption power. One reason for which the aspect ratio of the emitter cannot be raised is that the aperture is gradually closed in controlling the emitter height as described previously. Another reason is that the emitter base length is almost the same as the diameter of a mask used in stepper exposure, so a base length smaller than the stepper exposure limit cannot be formed. Since this stepper exposure limit imposes limitations on the emitter base length, it brings about another problem in increasing the degree of integration of the emitters.

BRIEF SUMMARY OF THE INVENTION

The present invention has been made to solve the above problems, and one of its objects is to provide a field emission cold-cathode device having uniform field emission characteristics, capable of being driven with a low voltage, and also having a high field emission efficiency, and a method of manufacturing the same.

It is another object of the present invention to provide a field emission cold-cathode device which is readily highly integrated and has a high productivity, and by which a large number of sharp emitters having the same shape can be formed, and a method of manufacturing the same.

It is still another object of the present invention to provide a vacuum micro device using the field emission cold-cathode device having the excellent characteristics as described above.

According to a first aspect of the present invention, there is provided a field emission cold-cathode device comprising a support member and an emitter arranged on the support member to emit electrons, wherein the emitter comprises a fullerene or a carbon nanotube.

According to a second aspect of the present invention, there is provided a vacuum micro device comprising:
  a support member;
  an emitter formed on the support member to emit electrons, the emitter comprising a fullerene or a carbon nanotube;
  a surrounding member for forming, together with the support member, a vacuum discharge space surrounding the emitter; and
  an extracting electrode formed to be spaced apart from the emitter, the emitter emitting electrons due to a potential difference between the emitter and the extracting electrode.

According to a third aspect of the present invention, there is provided a method of manufacturing a field emission cold-cathode device comprising a support member and a plurality of emitters formed on the support member to emit electrons, comprising the steps of:
  arranging a collecting member in a vacuum processing chamber;
  setting an inert gas vacuum atmosphere in the vacuum processing chamber;
  sublimating carbon in the vacuum processing chamber;

forming carbon nanotubes by depositing the carbon on the collecting member; and transferring the carbon nanotubes from the collecting member onto the support member and forming the emitters comprising the carbon nanotubes.

According to a fourth aspect of the present invention, there is provided a method of manufacturing a field emission cold-cathode device comprising a support member and a plurality of emitters formed on the support member to emit electrons, comprising the steps of:

arranging the support member in a vacuum processing chamber;

setting an inert gas vacuum atmosphere in the vacuum processing chamber;

sublimating carbon in the vacuum processing chamber; and depositing the carbon as carbon nanotubes on the support member, thereby forming the emitters comprising the carbon nanotubes.

According to a fifth aspect of the present invention, there is provided a method of manufacturing a field emission cold-cathode device comprising a support member and an emitter formed on the support member to emit electrons, comprising the steps of:

forming a recess having a pointed bottom in a mold member;

arranging a fullerene or a carbon nanotube in the recess;

forming a conductive projection by filling a conductive material in the recess;

adhering the support member to the mold member so as to sandwich the conductive projection therebetween; and removing the mold member to expose the emitter comprising the conductive projection and the fullerene or carbon nanotube on the support member.

BRIEF DESCRIPTION OF THE SEVERAL VIEWS OF THE DRAWING

FIGS. 11A and 11B are a schematic sectional view showing a field emission cold-cathode device according to still another embodiment of the present invention, and an enlarged schematic view showing the tip of the device, respectively;

FIG. 12 is a schematic sectional view showing a field emission cold-cathode device according to still another embodiment of the present invention;

DETAILED DESCRIPTION OF THE INVENTION

Figure 1A:
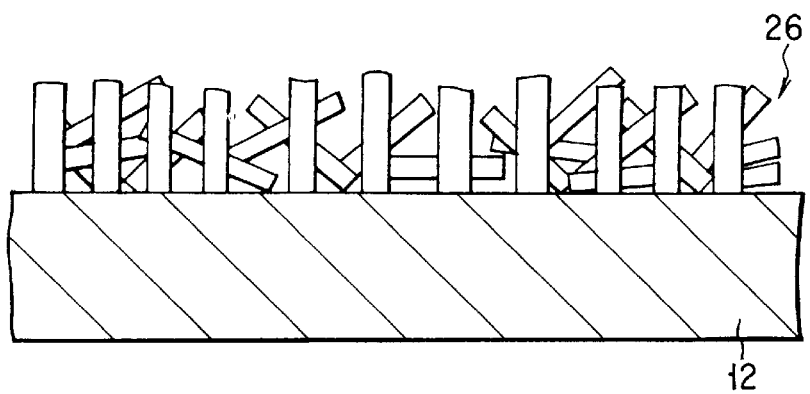
FIGS. 1A and 1B are schematic sectional views showing a field emission cold-cathode device according to an embodiment of the present invention in order of manufacturing steps.

The present invention will be described in detail below with reference to embodiments shown in the accompanying drawings. In the following embodiments, the same reference numerals denote corresponding parts, and a repetitive description will be made only where necessary.

Figure 1B:
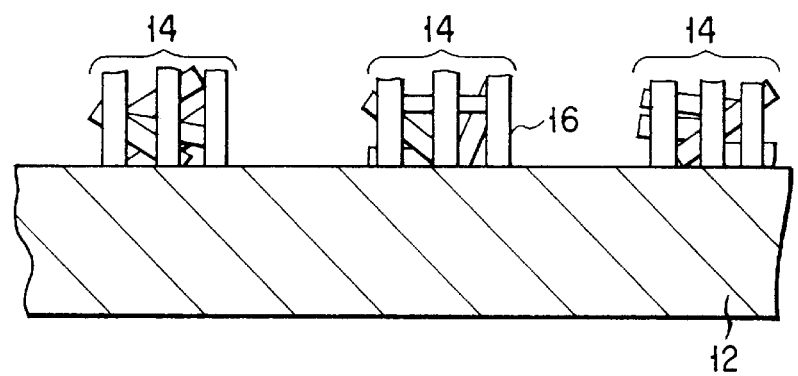

FIGS. 1A and 1B are schematic sectional views showing a field emission cold-cathode device according to an embodiment of the present invention in order of manufacturing steps.

As shown in FIG. 1B, the field emission cold-cathode device according to this embodiment has a support substrate 12 and emitters 14 formed on the support substrate 12 to emit electrons. Either a plurality of emitters 14 or one emitter 14 is formed on the support substrate 12 in accordance with the application purpose of the field emission cold-cathode device.

When the support substrate 12 also serves as a cathode interconnecting layer, the support substrate 12 is basically made of a conductive material such as Mo, Ta, W, Cr, Ni, Cu, carbon, or a semiconductor such as impurity-doped Si. When a cathode interconnecting layer is separately formed, the support substrate 12 is basically made of an insulating material such as glass, quartz, or a synthetic resin, or from a semiconductor material such as Si.

Each emitter 14 is made up of a plurality of carbon nanotubes 16 basically constituted by an array of 6-membered rings of carbon. As shown in FIGS. 1A and 1B, the carbon nanotubes 16 normally exist like fallen trees overlapping each other on the support substrate 12. However, for the sake of simplicity, the carbon nanotubes 16 rise nearly vertically in the following drawings. Each emitter 14 can also be made up of one carbon nanotube 16. 70% or more of all of the carbon nanotubes 16 have diameters of 30 nm or less. An aspect ratio which represents the ratio of the height to the bottom diameter of the carbon nanotube 16 forming the emitter 14 is set to be 3 or more to $1 \times 10^6$ or less, preferably 3 or more to $1 \times 10^3$ or less.

Figure 2A:
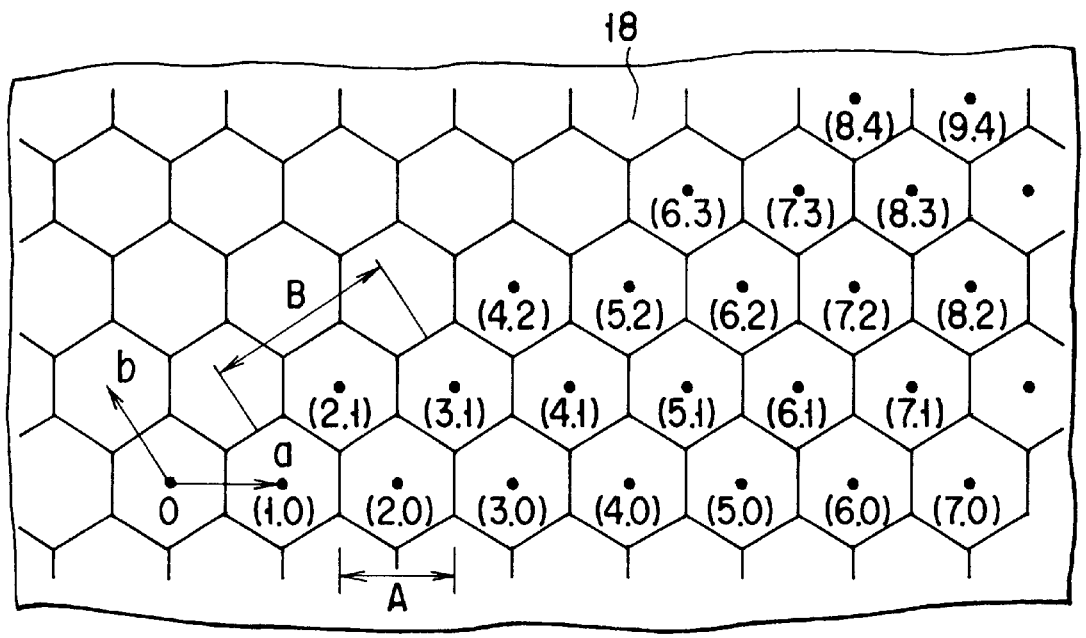
FIGS. 2A to 2C are views showing details of a carbon nanotube and a fullerene.
Figure 2B:
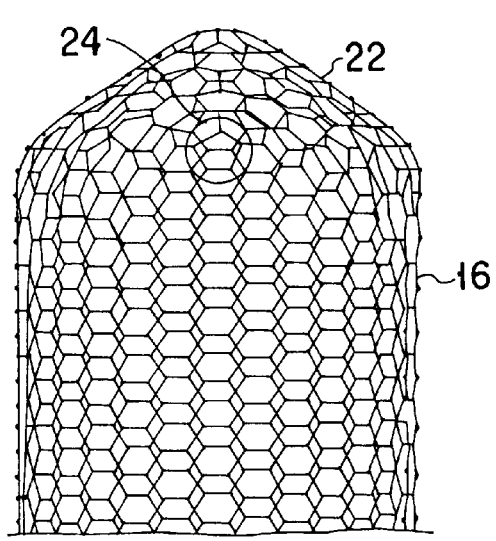

The carbon nanotube 16 is formed by winding a graphite sheet 18, having a molecular structure basically constituted by an array of 6-membered rings of carbon as shown in FIG. 2A, into a cylindrical shape as shown in FIG. 2B. The graphite sheet 18 shows the properties of a metal when wound in the direction of a period B (this period is 0.426 nm) of the 6-membered rings. Also, even when wound in the direction of a period A (this period is 0.246 nm) of the 6-membered rings, the graphite sheet 18 exhibits the semiconductive properties with a narrow forbidden band if it is wound such that lattice points at $3 \times (1, 0)$, e.g., $(3, 0)$, $(6, 0)$, and $(9, 0)$ are connected. Accordingly, the period of the 6-membered rings of carbon in the carbon nanotube 16 is a multiple of 0.426 nm in the period B direction or a multiple of 0.738 nm (=0.246 nm×3) in the period A direction.

Note that the end portion of the carbon nanotube 16 is either closed as shown in FIG. 2B or left open in the form of a cylinder without being closed. A graphite sheet 22 which closes the end portion of the carbon nanotube 16 has a structure in which 5-membered rings and/or 7-membered rings of carbon interpose in an array of 6-membered rings of carbon. For example, a 5-membered ring of carbon interposes in a portion 24 in FIG. 2B. This is so because the end portion cannot be closed only with a 6-membered ring of carbon.

Two examples of methods of manufacturing the field emission cold-cathode device according to this embodiment will be described below.

In the first example of the manufacturing methods, a pair of graphite electrodes each having a diameter of 6.5 to 20 nm are prepared and placed as an anode electrode (carbon source) and a cathode electrode (collecting member) in a vacuum processing chamber. The vacuum processing chamber is then evacuated, and an inert gas such as He or Ar is introduced into the vacuum processing chamber to set an inert gas atmosphere of 20 Torr to 500 Torr, and preferably about 500 Torr in the vacuum processing chamber.

Subsequently, a DC voltage of 10V to 20V is applied between the anode and cathode electrodes to generate arc discharge so that the current is about 100 A. In this way, carbon in the anode electrode is sublimated and deposited on the cathode electrode to form carbon nanotubes. The carbon deposition conditions are so adjusted that the carbon nanotubes are basically constituted by an array of 6-membered rings of carbon and the period of the 6-membered rings is a multiple of 0.426 nm or 0.738 nm.

By adjusting the gas pressure or the voltage at which arc discharge is generated as described above, the diameters of the carbon nanotubes can be decreased to 30 nm or less. The shapes of the formed carbon nanotubes vary in accordance with the process conditions and the like. However, particularly no problem arose in characteristics when carbon nanotubes having a diameter of 30 nm or less accounted for 70% or more of all of the carbon nanotubes.

Subsequently, the cathode electrode is dipped into ethanol, and ultrasonic waves are applied to separate the carbon nanotubes from the cathode electrode and disperse the carbon nanotubes in ethanol. The carbon nanotubes are then removed from ethanol by a ceramic filter or filter paper and dried. Note that after being separated, the carbon nanotubes can also be purified and classified so as to meet the use conditions.

Subsequently, the carbon nanotubes are supplied onto the support substrate 12 by a method of, e.g., coating, contact bonding, or burying, thereby forming a carbon nanotube layer 26 (FIG. 1A). As the material of the support substrate, it is possible to use polymethylmethacrylate, Teflon, polytetrafluoroethylene, polycarbonate, amorphous polyolefin, an acryl-series resin, or an epoxy-series resin.

Subsequently, a resist is coated, and the carbon nanotube layer 26 is patterned by lithography in accordance with the layout of the emitters 14. In this manner, the emitters 14 made up of a plurality of carbon nanotubes 16 are formed on the support substrate 12 (FIG. 1B).

In the above first example of the manufacturing methods, an AC voltage, instead of a DC voltage, can also be applied between the pair of graphite electrodes. Furthermore, the carbon nanotubes can be used together with the cathode electrode (collecting member), without being separated from the cathode electrode (collecting member), in the field emission cold-cathode device.

In the second example of the manufacturing methods, a graphite rod having a diameter of 6.5 nm to 20 nm is placed in a vacuum processing chamber. The support substrate 12 is directly arranged in the vacuum processing chamber. The vacuum processing chamber is then evacuated, and an inert gas such as He or Ar is introduced into the vacuum processing chamber to set an inert gas atmosphere of 20 Torr to 500 Torr, and preferably about 500 Torr in the vacuum processing chamber.

Subsequently, the graphite rod is energized and heated by resistance self-heating. In this way, carbon in the graphite rod is sublimated and deposited on the support substrate 12 to form the carbon nanotube layer 26 (FIG. 1A). The carbon deposition conditions are so set that the carbon nanotubes are basically constituted by an array of 6-membered rings of carbon and the period of the 6-membered rings is a multiple of 0.426 nm or 0.738 nm.

By adjusting the gas pressure or the voltage at which arc discharge is generated as described above, the diameters of the carbon nanotubes can be decreased to 30 nm or less. The shapes of the formed carbon nanotubes vary in accordance with the process conditions and the like. However, particularly no problem arose in characteristics when carbon nanotubes having a diameter of 30 nm or less accounted for 70% or more of all of the carbon nanotubes.

Subsequently, a resist is coated, and the carbon nanotube layer 26 is patterned by lithography in accordance with the layout of the emitters 14. In this manner, the emitters 14 made up of a plurality of carbon nanotubes 16 are formed on the support substrate 12 (FIG. 1B).

As the means for sublimating carbon in the vacuum processing chamber, it is also possible to use an electron beam and laser beam irradiation other than arc discharge and resistance heating used in the first and second examples of the manufacturing methods described above.

Figure 3A:
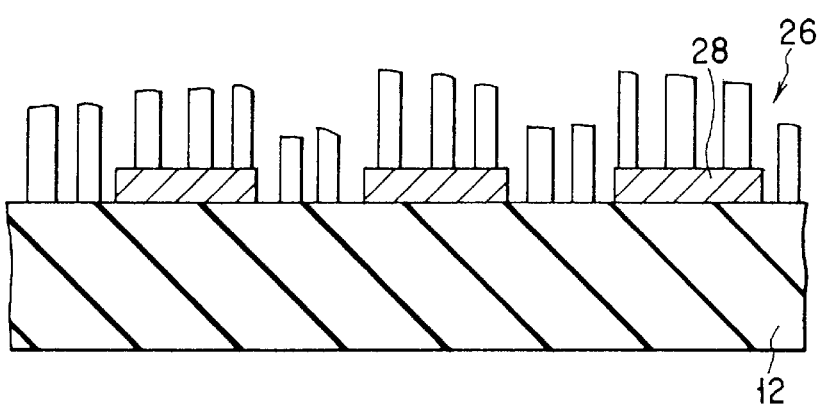
FIGS. 3A and 3B are schematic sectional views showing a field emission cold-cathode device according to another embodiment of the present invention in order of manufacturing steps.
Figure 3B:
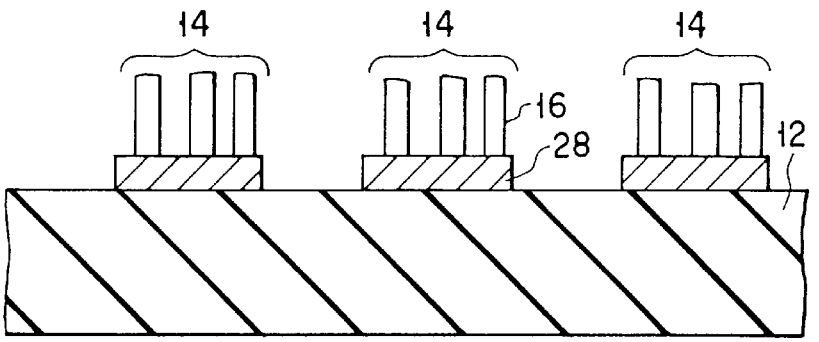

FIGS. 3A and 3B are schematic sectional views showing a field emission cold-cathode device according to another embodiment of the present invention in order of manufacturing steps.

As shown in FIG. 3B, the field emission cold-cathode device according to this embodiment differs from the field emission cold-cathode device shown in FIG. 1B in that a cathode interconnecting layer 28 for supplying electrons to emitters 14 is formed on a support substrate 12. The cathode interconnecting layer 28 is basically made of a conductive material such as Mo, Ta, W, Cr, Ni, or Cu. The support substrate 12 is basically made of an insulating material such as glass, quartz, or a synthetic resin, or from a semiconductor material such as Si.

The field emission cold-cathode device shown in FIG. 3B can be manufactured by substantially the same methods as for the field emission cold-cathode device shown in FIG. 1B. However, changes to be described below are added to the first and second examples of the manufacturing methods explained with reference to FIGS. 1A and 1B.

First, in the first example which uses an anode electrode (carbon source) and a cathode electrode (collecting member), the patterned cathode interconnecting layer 28 is formed on the support substrate 12 before carbon nanotubes separated from the cathode electrode (collecting member) are supplied onto the support substrate 12. Thereafter, the carbon nanotubes are supplied onto the support substrate 12 as described earlier, thereby forming a carbon nanotube layer 26 on the support substrate 12 and the cathode interconnecting layer 28 (FIG. 3A). Subsequently, the carbon nanotube layer 26 is patterned by lithography in accordance with the layout of the emitters 14, forming the emitters 14 made up of a plurality of carbon nanotubes 16 on the cathode interconnecting layer 28 (FIG. 3B).

In the second example in which carbon nanotubes are directly deposited on the support substrate 12, the patterned cathode interconnecting layer 28 is formed on the support substrate 12 before the support substrate 12 is placed in a vacuum processing chamber. Thereafter, the support substrate 12 having the cathode interconnecting layer 28 is arranged in the vacuum processing chamber, and an operation is performed as described previously. Consequently, carbon is deposited on the support substrate 12 and the cathode interconnecting layer 28 to form the carbon nanotube layer 26 (FIG. 3A). Subsequently, the carbon nanotube layer 26 is patterned by lithography in accordance with the layout of the emitters 14, forming the emitters 14 made up of a plurality of carbon nanotubes 16 on the cathode interconnecting layer 28 (FIG. 3B).

Figure 4A:
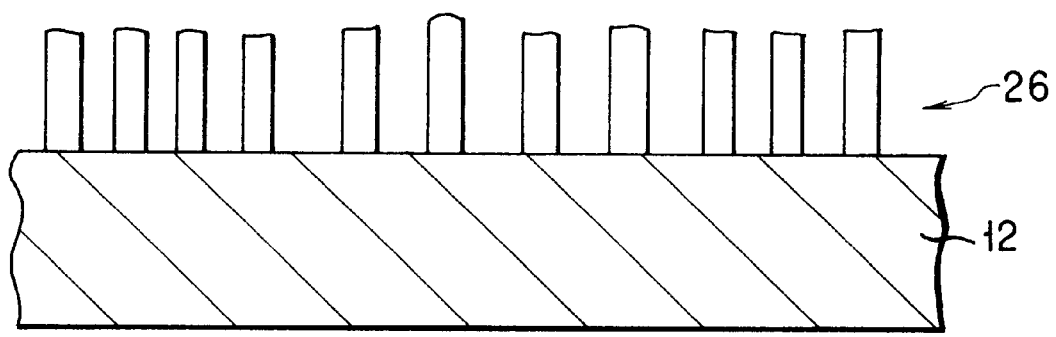
FIGS. 4A to 4C are schematic sectional views showing a field emission cold-cathode device according to still another embodiment of the present invention in order of manufacturing steps.
Figure 4B:
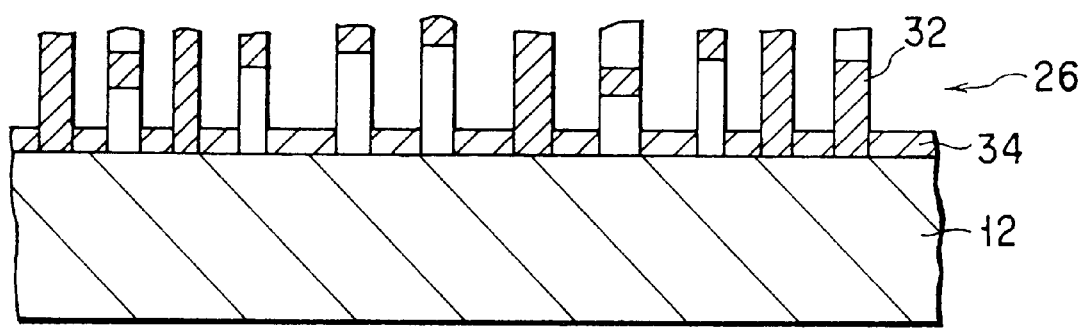
Figure 4C:
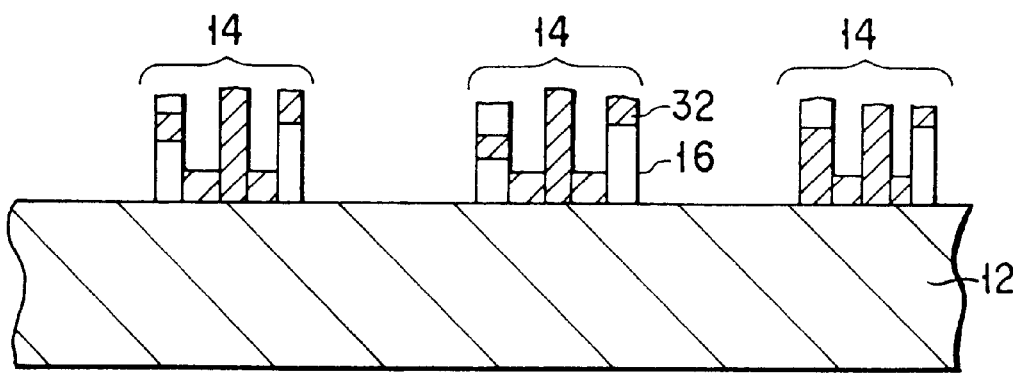

FIGS. 4A to 4C are schematic sectional views showing a field emission cold-cathode device according to still another embodiment of the present invention in order of manufacturing steps.

As shown in FIG. 4C, the field emission cold-cathode device according to this embodiment differs from the field emission cold-cathode device shown in FIG. 1B in that a conductive filling layer 32 capable of emitting electrons is formed in carbon nanotubes 16. The filling layer 32 is basically made of a conductive material such as Mo, Ta, W, Cr, Ni, Si, $LaB_6$, AlN, GaN, graphite, or diamond.

The field emission cold-cathode device shown in FIG. 4C can be manufactured by substantially the same methods as for the field emission cold-cathode device shown in FIG. 1B. However, the following changes are added.

First, a carbon nanotube layer 26 is formed on a support substrate 12 as described earlier (FIG. 4A). Subsequently, a conductive material layer 34 is formed on the entire surface of the support substrate 12 by depositing a sublimated conductive material from above or dipping the whole completed structure into a molten conductive material. This formation is so performed that the filling layer 32 is primarily formed in the distal end portions of carbon nanotubes (FIG. 4B). In theory, a conductive material drawn into a tube is readily formed in the center of the tube where the material is energetically most stable. However, the drawing of the conductive material sometimes stops in the middle of a tube due to various conditions such as the existence of a gas in the tube.

Subsequently, patterning is performed by lithography in accordance with the layout of emitters 14, thereby removing portions of the conductive material layer 34 directly contacting the support substrate 12 and forming the emitters 14 made up of a plurality of carbon nanotubes 16 on the support substrate 12 (FIG. 4C). Note that the carbon nanotubes 16 are tightly fixed on the support substrate 12 by the conductive material layer 34. Therefore, it is possible to provide a structure easy to handle and having a high reliability compared to the structure shown in FIG. 1B.

Figure 5A:
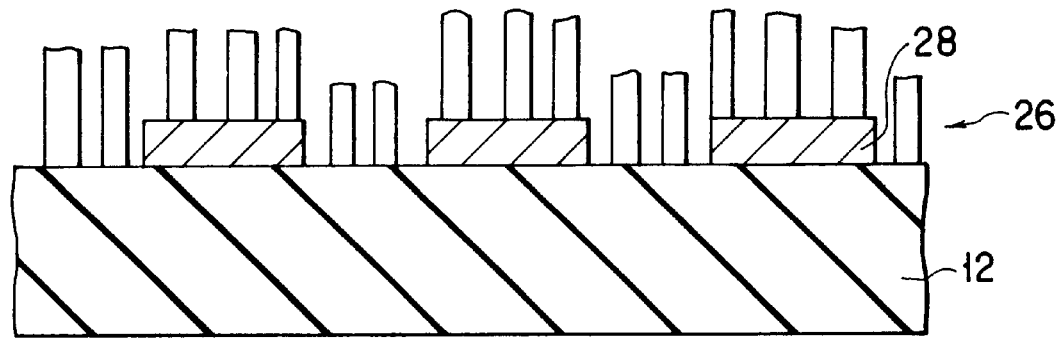
FIGS. 5A to 5C are schematic sectional views showing a field emission cold-cathode device according to still another embodiment of the present invention in order of manufacturing steps.
Figure 5B:
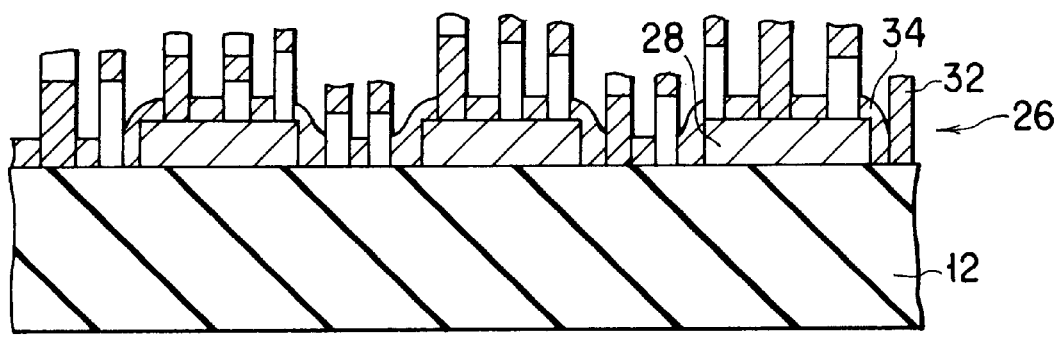
Figure 5C:
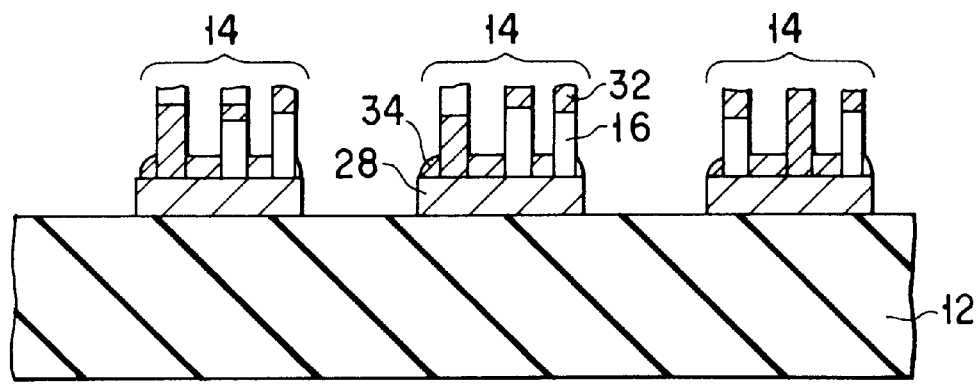

FIGS. 5A to 5C are schematic sectional views showing a field emission cold-cathode device according to still another embodiment of the present invention in order of manufacturing steps.

As shown in FIG. 5C, the field emission cold-cathode device according to this embodiment differs from the field emission cold-cathode device shown in FIG. 3B in that a conductive filling layer 32 capable of emitting electrons is formed in carbon nanotubes 16. The filling layer 32 is basically made of the material described with reference to FIGS. 4A to 4C. Note that the filling layer 32 can also be made of basically the same material as a cathode interconnecting layer 28.

The field emission cold-cathode device shown in FIG. 5C can be manufactured by substantially the same methods as for the field emission cold-cathode device shown in FIG. 3B. However, the following changes are added.

First, a carbon nanotube layer 26 is formed on a support substrate 12 and the cathode interconnecting layer 28 as described previously (FIG. 5A). Subsequently, a conductive material layer 34 is formed on the entire surface of the support substrate 12 by depositing a sublimated conductive material from above or dipping the whole completed structure into a molten conductive material. Consequently, the filling layer 32 is primarily formed in the distal end portions of carbon nanotubes (FIG. 5B). Subsequently, patterning is performed by lithography in accordance with the layout of emitters 14, thereby removing portions of the conductive material layer 34 directly contacting the support substrate 12 and forming the emitters 14 made up of a plurality of carbon nanotubes 16 on the cathode interconnecting layer 28 (FIG. 5C).

Note that in the embodiments shown in FIGS. 4A to 4C and 5A to 5C, it is possible to previously select the material or treat the surface of the support substrate 12 in order to improve the release properties between the surface of the support substrate 12 and the conductive material of the filling layer 32. The filling layer 32 can also be formed during preparation before carbon nanotubes are supplied onto the support substrate 12. If this is the case, the filling layer 32 can be formed in carbon nanotubes by depositing a sublimated conductive material from above onto carbon nanotubes sticking to a collecting member or dipping carbon nanotubes sticking to or separated from a collecting member into a molten conductive material.

The structure (FIG. 5C) having the cathode interconnecting layer 28 and the filling layer 32 can also be formed by a manufacturing method as shown in FIGS. 6A to 6D. The manufacturing method shown in FIGS. 6A to 6D is an application of the first example of the manufacturing methods, which uses an anode electrode (carbon source) and a cathode electrode (collecting member), and the following changes are made.

Figure 6A:
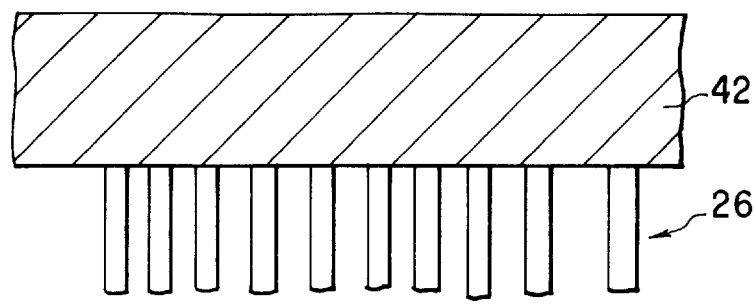
FIGS. 6A to 6D are schematic sectional views showing a field emission cold-cathode device according to still another embodiment of the present invention in order of manufacturing steps.
Figure 6B:
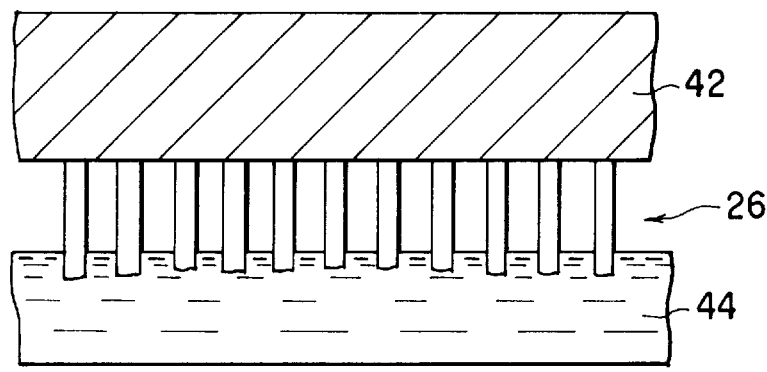

First, a carbon nanotube layer 26 is formed by depositing carbon on a cathode electrode (collecting member) 42 as described earlier (FIG. 6A). Subsequently, the carbon nanotube layer 26 sticking to the cathode electrode (collecting member) 42 is pressed against a synthetic resin layer 44 in a molten state (FIG. 6B). As the material of the synthetic resin layer 44, it is possible to use polymethylmethacrylate, Teflon, polytetrafluoroethylene, polycarbonate, amorphous polyolefin, an acryl-series resin, or an epoxy-series resin.

After the synthetic resin layer 44 is dried to form a support substrate 12, the cathode electrode (collecting member) 42 is removed from the carbon nanotube layer 26. That is, the carbon nanotube layer 26 is transferred from the cathode electrode (collecting member) 42 onto the support substrate 12.

Figure 6C:
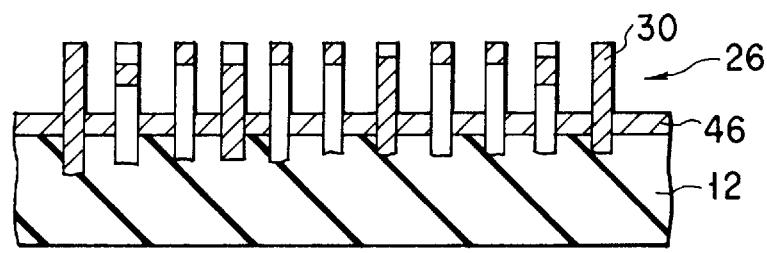
Figure 6D:
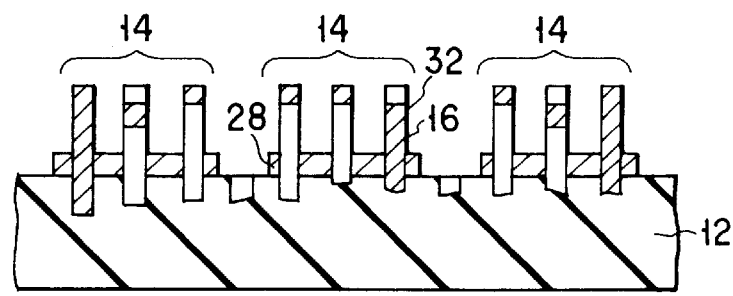

Subsequently, a conductive material layer 46 serving as a cathode interconnecting layer is formed on the support substrate 12 by depositing a sublimated conductive material from above or dipping the whole completed structure into a molten conductive material. Consequently, a filling layer 32 is primarily formed in the distal end portions of carbon nanotubes (FIG. 6C). Subsequently, a resist is coated, and the carbon nanotube layer 26 and the conductive material layer 46 are patterned by lithography in accordance with the layout of emitters 14. In this manner, the emitters 14 made up of a plurality of carbon nanotubes 16 are formed on a cathode interconnecting layer 28 (FIG. 6D).

As described above, the filling layer 32 and the cathode interconnecting layer 28 are made of the same material in the manufacturing method shown in FIGS. 6A to 6D.

Figure 7A:
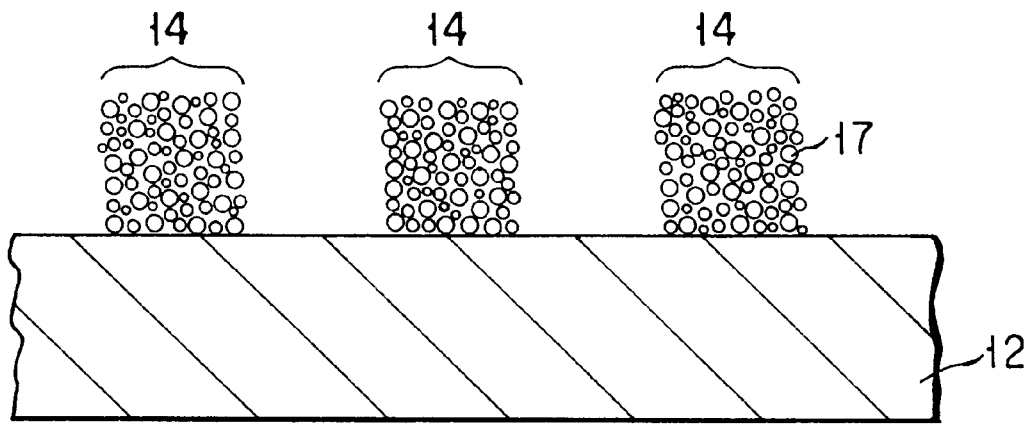
FIGS. 7A and 7B are schematic sectional views each showing a field emission cold-cathode device according to still another embodiment of the present invention.
Figure 7B:
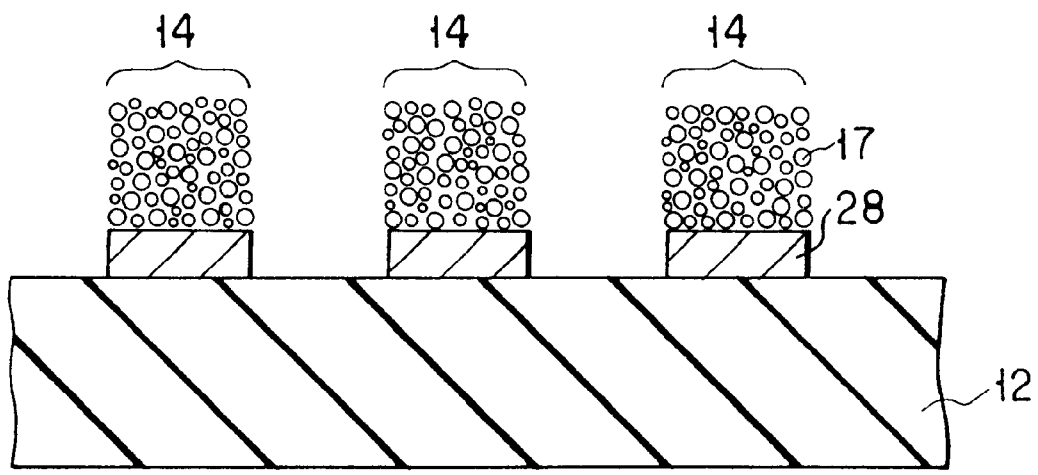

FIGS. 7A and 7B are schematic sectional views each showing a field emission cold-cathode device according to still another embodiment of the present invention. The characteristic feature of these embodiments is that emitters 14 are formed by using fullerenes 17 instead of carbon nanotubes. FIGS. 7A and 7B correspond to the structures shown in FIGS. 1B and 3B, respectively.

Figure 2C:
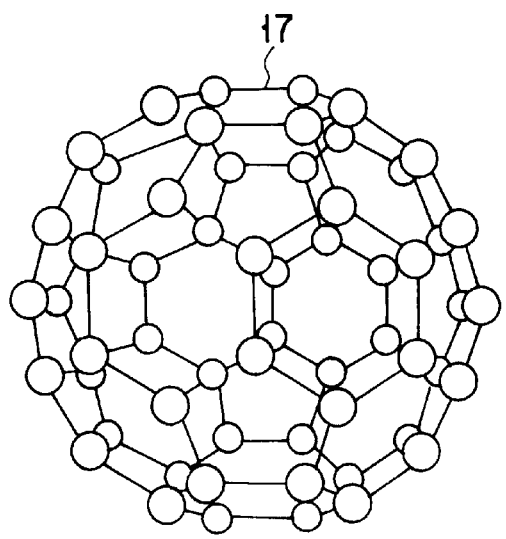

A fullerene is an allotrope of carbon like a carbon nanotube and basically the same kind as a carbon nanotube. An extremely long fullerene with a peculiar shape forms a carbon nanotube. As shown in FIG. 2C, the basic shape of a fullerene is $C_{60}$ constituted by 6- and 5-membered rings of carbon, and its diameter is about 0.7 nm. $C_{60}$ has a structure in which $sp^2$-orbit-mixed carbon atoms are placed on all apexes of a truncated icosahedron (eventually a 32-face body) formed by cutting off all apexes forming twelve pentagonal pyramids of a regular icosahedron.

In addition to $C_{60}$, higher order fullerenes having more than 60 carbon atoms exist essentially infinitely. Examples are $C_{70}$, $C_{76}$, $C_{82}$, $C_{84}$, $C_{90}$, $C_{96}$, . . . , $C_{240}$, $C_{540}$, and $C_{720}$. Note that a high order fullerene exists under conditions that the fullerene satisfies an Euler's formula F+V=E+2 (F: the number of polygons, V: the number of apexes, E: the number of sides of a polygon) and p=s+12 (p: the number of 5-membered rings, s: the number of 7-membered rings) and is chemically stable as a carbon atom.

Since the interior of a fullerene is hollow, onion type fullerenes in which a number of layers of lower order fullerenes are stacked like an onion in higher order fullerenes exist. These fullerenes are called super fullerenes. The distance between individual layers in a super fullerene is 0.341 nm. For example, a fullerene in which $C_{240}$ enters into $C_{540}$ and $C_{60}$ enters into $C_{240}$ is represented by $C_{60}@C_{240}@C_{540}$. A symbol "@" indicates that a fullerene is an incorporating fullerene in which a molecule or an atom described before this symbol is incorporated.

A fullerene can also incorporate a metal into its hollow interior. Examples of this metal-incorporating fullerene are $La@C_{60}$, $La@C_{76}$, $La@C_{84}$, $La_2@C_{80}$, $Y_2@C_{84}$, and $Sc_3@C_{82}$. Furthermore, a heterofullerene incorporating an element other than carbon, such as N, B, or Si, into its skeleton is being researched.

A fullerene can be prepared by performing, e.g., laser irradiation, arc discharge, or resistance heating for graphite to vaporize carbon, and then by cooling, reacting, and aggregating the vaporized carbon through helium gas to collect the resultant carbon by a collecting member.

The field emission cold-cathode device shown in FIGS. 7A and 7B can be manufactured by applying the manufacturing methods described with reference to FIGS. 1A and 1B and FIGS. 3A and 3B, respectively.

That is, when the first example of the manufacturing methods described above is to be applied, the fullerenes 17 are first separately prepared and collected and are supplied onto a support substrate 12 or onto the support substrate 12 and a cathode interconnecting layer 28 by a method of, e.g., coating, contact bonding, or burying, thereby forming a fullerene layer. When the second example of the above manufacturing methods is to be applied, the support substrate 12 or the support substrate 12 with the cathode interconnecting layer 28 is used as a collecting member to form a fullerene layer on this collecting member. Subsequently, a resist is coated, and the fullerene layer is patterned by lithography in accordance with the layout of emitters 14. Consequently, the emitters 14 made up of a plurality of fullerenes 17 can be formed on the support substrate 14 or the cathode interconnecting layer 28.

Additionally, when a conductive material layer 34 is used as shown in FIGS. 4A to 4C and FIGS. 5A to 5C, the fullerenes 17 can be tightly fixed on the support substrate 14 or the cathode interconnecting layer 28. When the manufacturing method shown in FIGS. 6A to 6D is applied, the fullerenes 17 can be transferred from the collecting member onto the support substrate 14.

Figure 8A:
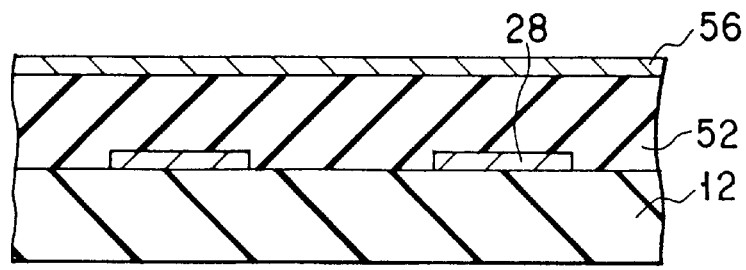
FIGS. 8A to 8C are schematic sectional views showing a field emission cold-cathode device according to still another embodiment of the present invention in order of manufacturing steps.
Figure 8B:
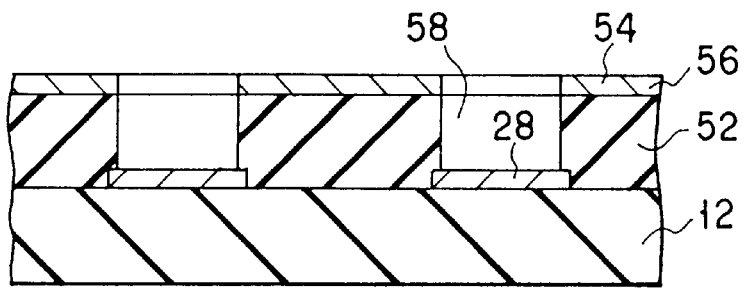
Figure 8C:
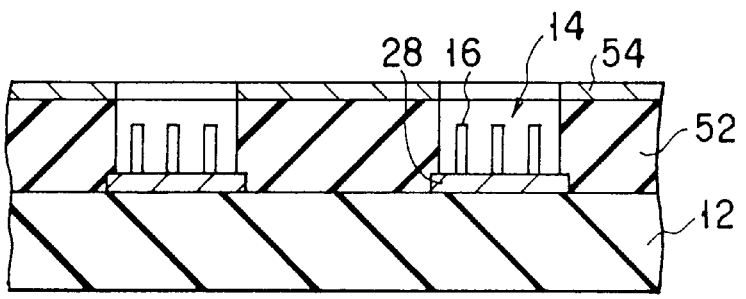

FIGS. 8A to 8C are schematic sectional views showing a field emission cold-cathode device according to still another embodiment of the present invention in order of manufacturing steps.

As shown in FIG. 8C, the field emission cold-cathode device according to this embodiment has extracting electrodes, i.e., gate electrodes 54 formed on a support substrate 12 via an insulating film 52 by using a conductive material such as W, in addition to the structure shown in FIG. 3B. The gate electrode 54 opposes an emitter 14 made up of carbon nanotubes 16 with a gap between them.

The field emission cold-cathode device shown in FIG. 8C can be manufactured by the following method.

First, a patterned cathode interconnecting layer 28 is formed on the support substrate 12. As described earlier, the cathode interconnecting layer 28 is basically made of a conductive material such as Mo, Ta, W, Cr, Ni, or Cu. The support substrate 12 is basically made of an insulating material such as glass, quartz, or a synthetic resin, or from a semiconductor material such as Si.

Subsequently, the insulating layer 52 made of, e.g., $SiO_2$ or SiN is formed on the support substrate 12 and the cathode interconnecting layer 28, and a gate electrode layer 56 made of a conductive material such as W is formed on the insulating layer 52 (FIG. 8A). The insulating layer 52 can be formed by electron-beam deposition, sputtering, or CVD.

Subsequently, the insulating layer 52 and the gate electrode layer 56 are patterned by lithography to form the gate electrodes 54 and gate interconnections such that the cathode interconnecting layer 28 is exposed in recesses 58 surrounded by the gate electrodes 54 (FIG. 8B).

Subsequently, a carbon nanotube layer is formed on the entire major surface of the object being processed, i.e., target object, not only in the recesses 58 but also outside the recesses 58. The carbon nanotube layer can be formed by supplying previously prepared carbon nanotubes onto the target object by, e.g., coating or printing, or by placing the target object in a vacuum processing chamber and depositing carbon nanotubes directly on the object. The carbon nanotube layer is then patterned by lithography to form the emitters 14 by leaving the carbon nanotubes 16 behind only on the cathode interconnecting layer 28 (FIG. 8C).

Figure 8D:
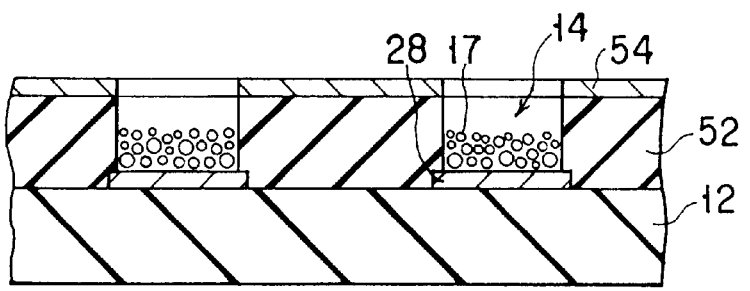
FIG. 8D is a schematic sectional view showing a modification of the embodiment in FIGS. 8A to 8C.

In this embodiment, fullerenes 17 can also be used instead of carbon nanotubes. If this is the case, the structure and the manufacturing method are generally similar to those explained with reference to FIGS. 8A to 8C except that the emitters 14 are made up of the fullerenes 17 as shown in FIG. 8D.

Figure 9A:
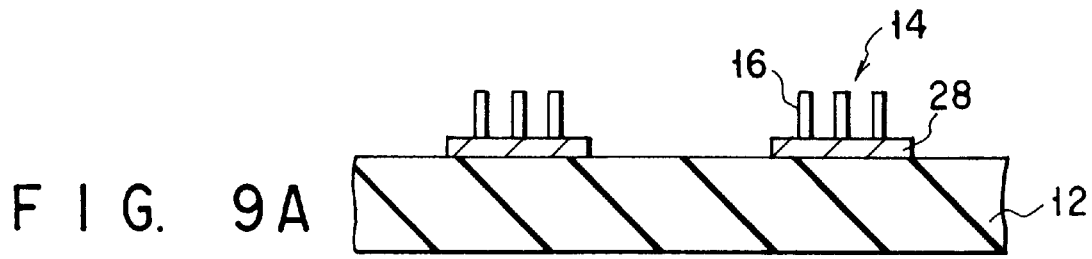
FIGS. 9A to 9C are schematic sectional views showing a field emission cold-cathode device according to still another embodiment of the present invention in order of manufacturing steps.
Figure 9B:
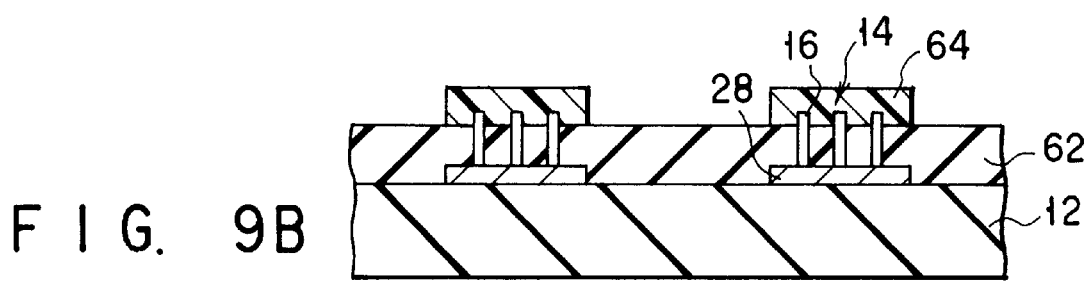
Figure 9C:
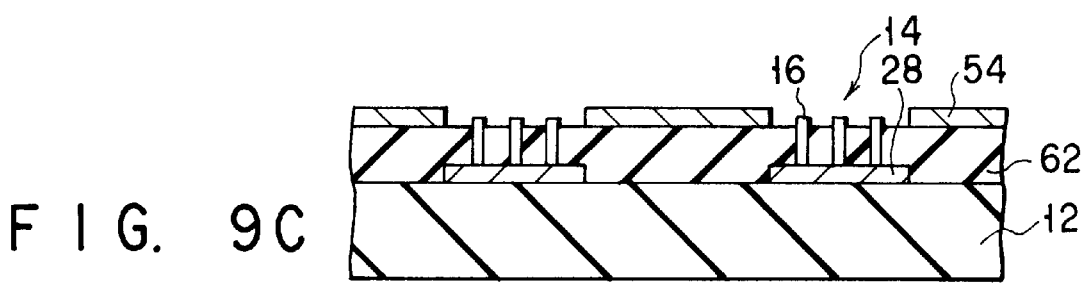

FIGS. 9A to 9C are schematic sectional views showing a field emission cold-cathode device according to still another embodiment of the present invention in order of manufacturing steps.

As shown in FIG. 9C, the field emission cold-cathode device according to this embodiment has extracting electrodes, i.e., gate electrodes 54 formed on a support substrate 12 via an insulating film 62 by using a conductive material such as W, similar to the field emission cold-cathode device shown in FIG. 8C. However, this device differs from that shown in FIG. 8C in that carbon nanotubes 16 forming emitters 14 are partially buried in the insulating film 62 and firmly fixed.

The field emission cold-cathode device shown in FIG. 9C can be manufactured by the following method.

First, a patterned cathode interconnecting layer 28 is formed on the support substrate 12. Subsequently, a carbon nanotube layer is formed on the support substrate 12 and the cathode interconnecting layer 28. The carbon nanotube layer can be formed by supplying previously prepared carbon nanotubes onto the target object by, e.g., coating or printing, or by placing the target object in a vacuum processing chamber and depositing carbon nanotubes directly on the object. The carbon nanotube layer is then patterned by lithography to form the emitters 14 by leaving the carbon nanotubes 16 behind only on the cathode interconnecting layer 28 (FIG. 9A).

Subsequently, the insulating layer 62 made of, e.g., SiO$_2$ or SiN is formed on the entire major surface of the target object so that the layer 62 has a thickness by which the tips of the emitters 14 are slightly exposed. The insulating layer 62 can be formed by electron-beam deposition, sputtering, or CVD. The thickness of the insulating film 62 can be controlled during the film formation or can be adjusted by slight etch back after the film formation. For example, when the insulating film 62 is made of SiO$_2$, buffered hydrofluoric acid can be used in the etching.

Subsequently, a resist layer 64 is formed on the entire major surface of the target object and patterned such that the insulating layer 62 is exposed at portions where the gate electrodes 54 are to be formed (FIG. 9B). A gate electrode layer made of a conductive material such as W is then formed on the entire major surface of the target object. Subsequently, the resist layer 64 is removed by lift-off together with unnecessary portions of the gate electrode layer. Consequently, the gate electrodes 54 and gate interconnections having a predetermined pattern can be left behind on the insulating film 62 (FIG. 9C).

Figure 9D:
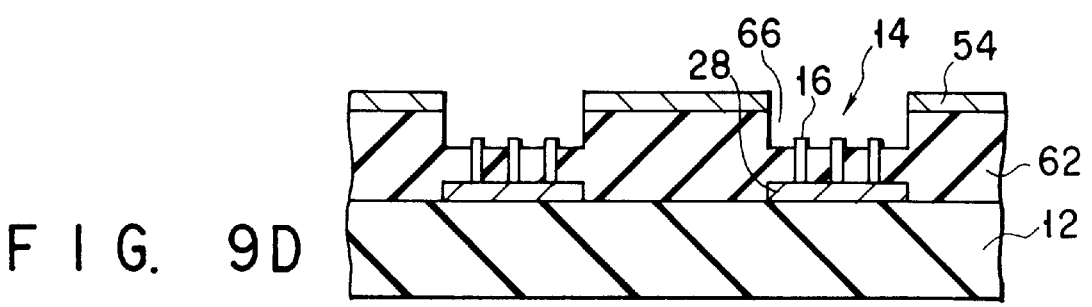
FIG. 9D is a schematic sectional view showing a modification of the embodiment in FIGS. 9A to 9C.

Note that in the step shown in FIG. 9B, the tips of the emitters can be exposed by forming the insulating layer 62 to have a thickness larger than the height of the emitters 14 and forming recesses 66 in portions corresponding to the emitters 14. The resultant structure is as shown in FIG. 9D. The gate electrode 54 exists above the tip of the emitter 14, and this arrangement is preferable as an extracting electrode.

In this embodiment, fullerenes 17 can be used instead of carbon nanotubes. If this is the case, the structure and the manufacturing method are generally similar to those explained with reference to FIGS. 9A to 9D except that the emitters 14 are made up of the fullerenes 17.

Figure 10A:
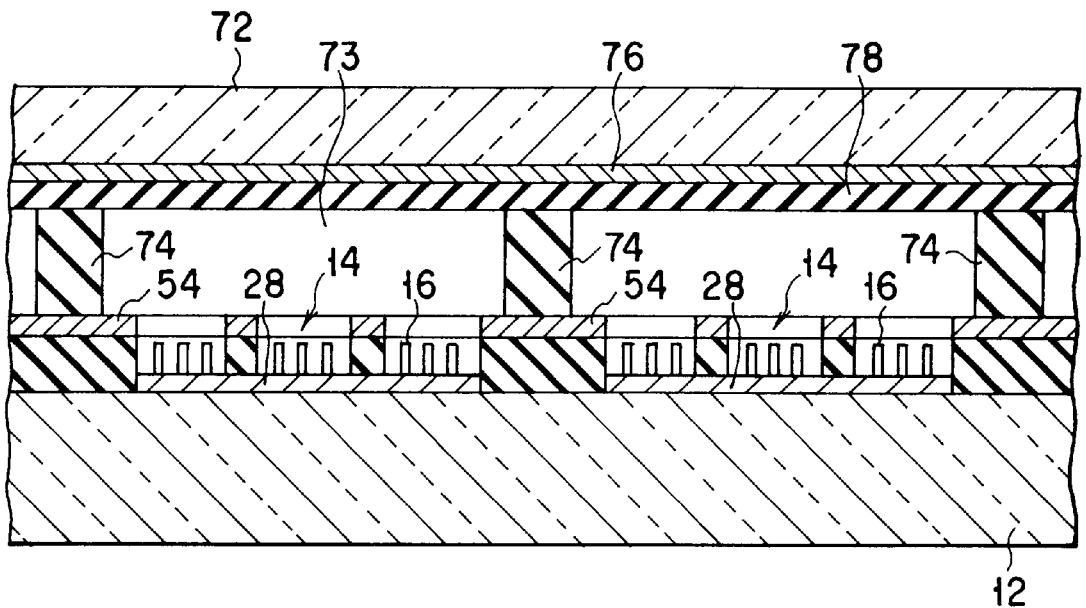
FIGS. 10A and 10B are enlarged schematic views each showing a flat image display device as an example of a vacuum micro device according to still another embodiment of the present invention.

FIG. 10A is a sectional view showing a flat image display device as one example of a vacuum micro device according to still another embodiment of the present invention.

The display device shown in FIG. 10A is formed by using the field emission cold-cathode device shown in FIG. 8C. As shown in FIG. 10A, a plurality of gate lines constituting gate electrodes 54 are arranged in a direction parallel to the drawing surface, and a plurality of cathode lines constituting a cathode interconnecting layer 28 are arranged in a direction perpendicular to the drawing surface. Emitter groups each including a plurality of emitters 14 are arranged on the cathode lines in a one-to-one correspondence with pixels.

A glass opposing substrate 72 is so disposed as to oppose a glass support substrate 12, and vacuum discharge spaces 73 are formed between the two substrates 12 and 72. The gap between the two substrates 12 and 72 is maintained by peripheral frames and spacers 74. A transparent common electrode or anode electrode 76 and a phosphor layer 78 are formed on the surface of the opposing substrate 72 which opposes the support substrate 12.

In this flat image display device, pixels can be selectively turned on or off by setting an arbitrary voltage between the gate electrode 54 and the emitter 14 at each pixel via the gate line and the cathode line. That is, a pixel can be selected by so-called matrix driving, e.g., by selecting a gate line in a line sequential manner and applying a predetermined potential to the line and, in synchronism with this potential application, applying a predetermined potential as a selection signal to a cathode line.

When a certain gate line and a certain cathode line are selected and respective predetermined potentials are applied to these lines, only an emitter group at the intersection between the gate line and the cathode line operates. Electrons emitted from the emitter group are attracted by a voltage applied to the anode electrode 76 and reach the phosphor layer 78 in a position corresponding to the selected emitter group, thereby making the phosphor layer 78 emit light.

Figure 10B:
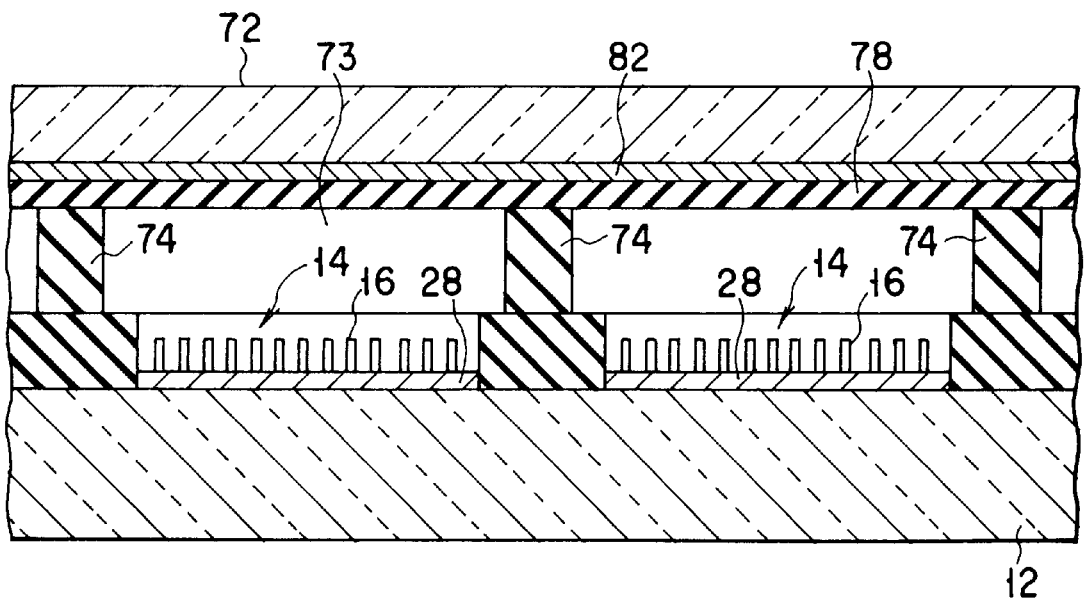

Note that as shown in FIG. 10B, a display device can be constructed without using the gate electrodes 54. The display device shown in FIG. 10B is formed by using the field emission cold-cathode device shown in FIG. 3B.

In this flat image display device, a plurality of anode lines, instead of cathode lines, constituting transparent anode electrodes 82 on the opposing substrate 72 are arranged in the direction parallel to the drawing surface. Accordingly, pixels can be selectively turned on or off by setting an arbitrary voltage between the anode electrode 82 and the emitter 14 at each pixel via the anode line and the cathode line. When a certain anode line and a certain cathode line are selected and respective predetermined potentials are applied to these lines, only an emitter group at the intersection between the anode line and the cathode line operates.

The display devices shown in FIGS. 10A and 10B are formed by using the field emission cold-cathode devices shown in FIGS. 8C and 3B, respectively. However, a display device can be similarly formed by using another embodiment, e.g., the field emission cold-cathode device having the emitters 14 made up of the fullerenes 17. Further, by using these field emission cold-cathode devices, vacuum micro devices other than display devices, e.g., power converters such as power switching devices can be formed.

FIGS. 11A and 11B are a schematic sectional view showing a field emission cold-cathode device according to still another embodiment of the present invention, and an enlarged schematic view showing the tip of the device, respectively.

The field emission cold-cathode device according to this embodiment has a support substrate 112 and emitters 115 formed on the support substrate 112 via a cathode interconnecting layer 114 to emit electrons. Each emitter 115 has a conductive projection 118 made of a portion of a conductive material layer 116 and a plurality of carbon nanotubes 122 partially buried in the tip of the conductive projection 118. Either a plurality of emitters 115 (only one is shown in the drawing) or one emitter 115 is formed on the support substrate 112 in accordance with the application purpose of the field emission cold-cathode device.

The support substrate 112 is made of an insulating material such as Pyrex glass. The cathode interconnecting layer 114 is basically made of a conductive material such as an ITO layer. The conductive material layer 116 and the conductive projection 118 are basically made of a conductive material such as Mo, Ta, W, Cr, Si, Ni, LaB$_6$, AlN, GaN, graphite, or diamond. When cathode interconnections are to be formed by using the conductive material layer 116, the cathode interconnecting layer 114 is omitted, and the conductive material layer 116 is directly formed on the support substrate 112.

As described earlier with reference to FIGS. 2A and 2B, the carbon nanotubes 122 are tubes basically constituted by an array of 6-membered rings of carbon. The lengths of the carbon nanotubes 122 are 3 nm to 10 µm, and 70% or more of the carbon nanotubes 122 have diameters of 30 nm or less. The carbon nanotubes 122 need only be so supported as to electrically connect with the conductive projection 118 and are not necessarily partially buried. Note that a plurality of carbon nanotubes 122 are formed on the conductive projection 118 in the drawing. However, one carbon nanotube 122 can also be formed.

The carbon nanotube 122 is usually formed into a hollow cylindrical shape. However, if necessary, a conductive filling layer 124 can be formed in the carbon nanotube 122, particularly in the distal end portion of the tube as shown in the drawing. The filling layer 124 is basically made of a conductive material capable of emitting electrons, e.g., Mo, Ta, W, Cr, Si, Ni, LaB$_6$, AlN, GaN, graphite, or diamond. The filling layer 124 can be made of the same material as or a material different from the material of the conductive material layer 116 and the conductive projection 118.

The structural features other than those described above and the preparation method of the carbon nanotubes 122 are analogous to those of the carbon nanotubes 16 described previously.

FIGS. 13A to 13F are views showing a method of manufacturing the field emission cold-cathode device shown in FIG. 11A in order of steps.

First, recesses with pointed bottoms are formed in one surface of a substrate made of, e.g., single crystal. As a method of forming recesses like this, the following method of using anisotropic etching of an Si single-crystal substrate can be used.

Figure 13A:
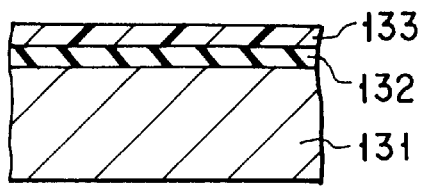
FIGS. 13A to 13F are schematic sectional views showing the field emission cold-cathode device shown in FIG. 1A in order of manufacturing steps.

First, a 0.1-µm thick SiO$_2$ thermal oxide layer 132 is formed by a dry oxidation method on a p-type (100)-oriented Si single-crystal substrate 131 serving as a mold substrate. Subsequently, the surface of the thermal oxide layer 132 is coated with a resist by spin coating, forming a resist layer 133 (FIG. 13A).

Figure 13B:
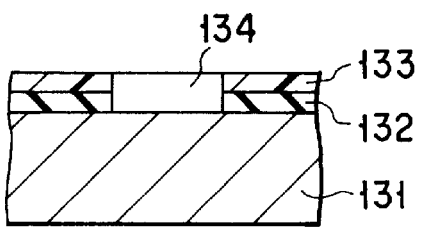

Subsequently, a stepper is used to perform processing steps such as exposure and development so as to obtain a plurality of apertures 134, e.g., square apertures of 1 µm side arranged in a matrix manner, thereby patterning the resist layer 133. The resist layer 133 is then used as a mask to etch the SiO$_2$ film by using an NH$_4$F—HF solution mixture (FIG. 13B).

After the resist layer 133 is removed, anisotropic etching is performed by using an aqueous 30-wt % KOH solution, thereby forming a recess 135 having a depth of 0.71 µm in the Si single-crystal substrate 131. Subsequently, the SiO$_2$ oxide layer is removed by using an NH$_4$F—HF solution mixture. The recess 135 is formed into an inverse pyramid defined by four inclined surfaces that are (111) planes by being etched with the aqueous KOH solution.

Note that the Si single-crystal substrate 131 in which the recess 135 is formed can also be thermally oxidized by a wet oxidation method to form an SiO$_2$ thermal oxide insulating layer on the entire surface including the recess 135. When this SiO$_2$ thermal oxide insulating layer is formed, the tip of a conductive projection to be formed by using the recess 135 as a mold can be more sharpened.

Figure 13C:
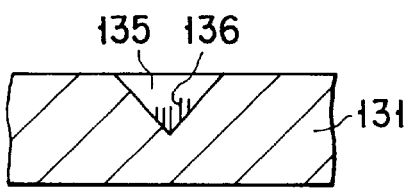

Subsequently, carbon nanotubes 136 are arranged on the bottom of the recess 135 (FIG. 13C). For example, as described earlier, carbon nanotubes deposited by a method using an anode electrode (carbon source) and a cathode electrode (collecting member) are dipped in ethanol, and ultrasonic waves are applied to separate the carbon nanotubes from the cathode electrode and disperse the carbon nanotubes in ethanol. Subsequently, the suspension of this ethanol is supplied into the recess 135 and dried. Consequently, the carbon nanotubes 136 can be arranged on the bottom of the recess 135. Even if carbon nanotubes adhere to a portion outside the recess 135, these carbon nanotubes usually do no harm. If these carbon nanotubes cause any inconvenience, they are removed by an organic solvent after patterning.

As another method of arranging the carbon nanotubes 136 on the bottom of the recess 135, it is also possible to form a graphite electrode near the substrate 131 and deposit carbon nanotubes on the bottom of the recess 135. This method is convenient because carbon nanotubes deposit more easily on the bottom than in the upper portion of the recess.

For the sake of simplicity, the carbon nanotubes 136 are not illustrated in FIGS. 13D to 13F below.

Subsequently, a conductive material layer 137 made of a conductive material such as W is deposited on the Si single-crystal substrate 131 so as to bury the recess 135. The conductive material layer 137 is so formed as to bury the recess 135 and have a uniform thickness, e.g., 2 µm, in a portion other than the recess 135.

During the formation of this conductive material layer 137, the conductive material layer 137 is not completely buried on the bottom on which a plurality of carbon nanotubes are placed. Therefore, after separation from the substrate 131, a state in which the carbon nanotubes partially protrude from the tip of a conductive projection can be obtained.

Figure 13D:
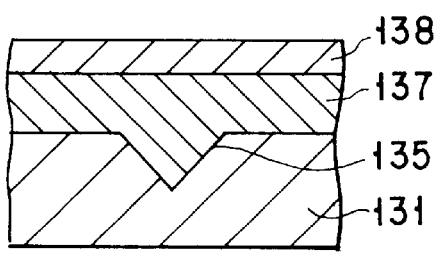
Figure 13E:
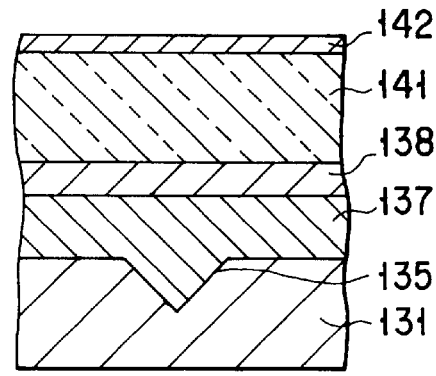
Figure 13F:
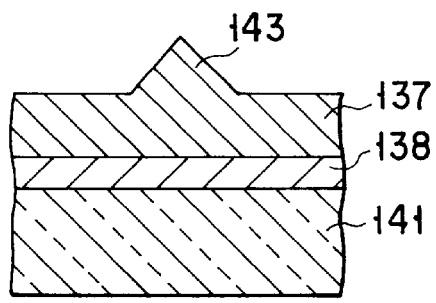

Furthermore, a conductive material layer 138 made of an ITO layer or Ta is similarly formed by sputtering to have a thickness of, e.g., 1 μm on the conductive material layer 137 (FIG. 13D). Note that this conductive material layer 138 can be omitted depending upon the material of the conductive material layer 137. If this is the case, the conductive material layer 137 also serves as a cathode electrode layer.

Meanwhile, a Pyrex glass substrate (thickness: 1 mm) 141 whose back surface is coated with a 0.4-μm thick Al layer 142 is prepared. As shown in FIG. 13E, the glass substrate 141 and the Si single-crystal substrate 131 are adhered via the conductive material layers 137 and 138. For example, electrostatic adhesion can be used as this adhesion. Electrostatic adhesion helps decrease the weight and thickness of a cold-cathode device.

Subsequently, the Al layer 142 on the back surface of the glass substrate 141 is removed by a mixed acid solution of $HNO_3$—$CH_3COOH$—HF. Additionally, the Si single-crystal substrate 131 is etched away by an aqueous ethylenediamine-pyrocatechol-pyrazine solution (ethylenediamine:pyrocatechol:pyrazine:water=75 cc:12 g:3 mg:10 cc). In this manner, the carbon nanotubes 136 (not shown) and a conductive projection 143 are exposed as shown in FIG. 13F.

If it is necessary to form the filling layer 124 (see FIG. 11B) in the carbon nanotubes 136, this filling layer 124 can be formed, after the conductive projection 143 is exposed, by depositing a sublimated conductive material from above the carbon nanotubes 136 or dipping the whole completed structure into a molten conductive material. Alternatively, before the carbon nanotubes 136 are arranged in the recess 135, the filling layer 124 can be formed by depositing a sublimated conductive material from above the carbon nanotubes 136 or dipping the carbon nanotubes 136 into a molten conductive material.

In the field emission cold-cathode device shown in FIG. 11A manufactured by the manufacturing method shown in FIGS. 13A to 13F, the conductive projection 118 (indicated by reference numeral 143 in FIG. 13F) of the emitter 115 is formed by using the recess 135 as a mold and therefore succeeds to the pyramidal shape of the recess 135. A plurality of carbon nanotubes 122 (indicated by reference numeral 136 in FIGS. 13C to 13E) are supported by the tip of the conductive projection 118 while being partially buried in the conductive projection 118.

If it is intended to largely protrude the carbon nanotubes 122 from the tip of the conductive projection 118, an $SiO_2$ layer is deposited by sputtering on the surface of the recess 135 after carbon nanotubes are arranged in the recess 135. Subsequently, the $SiO_2$ layer is backed with a conductive layer, the mold substrate is removed, and only the $SiO_2$ layer is removed by an $NH_4F$—HF solution mixture. Consequently, the length of the protrusion of the carbon nanotubes 122 from the conductive projection 118 is increased by the amount of the removed $SiO_2$ layer.

FIG. 12 is a schematic sectional view showing a field emission cold-cathode device according to still another embodiment of the present invention.

The embodiment shown in FIG. 12 differs from the embodiment shown in FIG. 11A in that a gate electrode 128 made of a conductive material such as W is formed on a conductive material layer 116 via an insulating film 126. The gate electrode 128 opposes an emitter 115, i.e., a conductive projection 118 and carbon nanotubes 122 with a gap between them.

FIGS. 14A to 14H are views showing a method of manufacturing the field emission cold-cathode device shown in FIG. 12 in order of steps.

First, as described previously with reference to FIGS. 13A, 13B, and 13C, a recess 135 with an inverse pyramidal shape defined by four inclined surfaces which are (111) planes is formed in a p-type (100)-oriented Si single-crystal substrate 131 as a mold substrate. Subsequently, the Si single-crystal substrate 131 in which the recess 135 is formed is thermally oxidized by a wet oxidation method to form an $SiO_2$ thermal oxide insulating layer 151 on the entire surface including the recess 135. This insulating layer 151 is so formed as to have a thickness of about 30 nm on the (111) plane of the substrate 131, i.e., on the side surfaces of the recess 135. The thickness of the thermal oxide layer on the (100) plane of Si single crystal agrees with the thickness on the (111) plane within ±10%. Therefore, the thickness of the oxidized insulating layer on the (111) plane can be estimated from the thickness on the (100) plane.

Figure 14A:
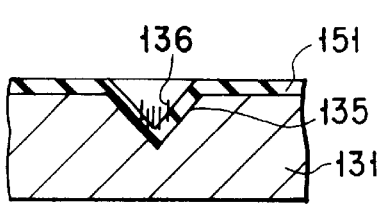
FIGS. 14A to 14H are schematic sectional views showing the field emission cold-cathode device shown in FIG. 12 in order of manufacturing steps.

After the insulating layer 151 is formed, carbon nanotubes 136 are arranged on the bottom of the recess 135 as follows (FIG. 14A). For the sake of simplicity, the carbon nanotubes 136 are not illustrated in FIGS. 14B to 14H below.

Figure 14B:
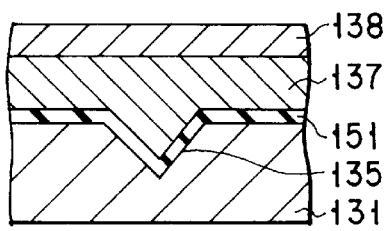

Subsequently, as in the step shown in FIG. 13D, a conductive material layer 137 made of a conductive material such as W is deposited on the Si single-crystal substrate 131 so as to bury the recess 135. Additionally, a conductive material layer 138 such as an ITO layer is similarly formed by sputtering on the conductive material layer 137 (FIG. 14B).

Figure 14C:
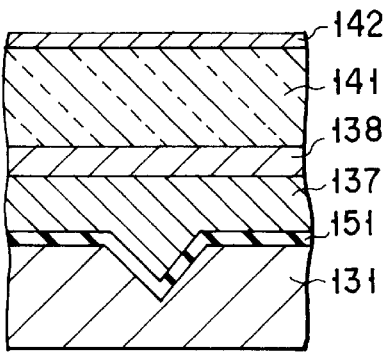
Figure 14D:
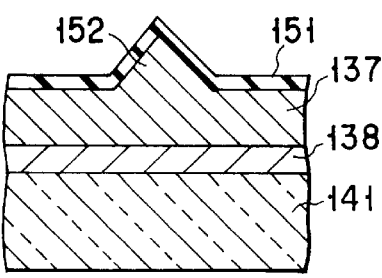

Subsequently, as in the step shown in FIG. 13E, a Pyrex glass substrate (thickness: 1 mm) 141 whose back surface is coated with a 0.4-μm thick Al layer 142 is adhered to the Si single-crystal substrate 131 via the conductive material layers 137 and 138 (FIG. 14C).

Subsequently, as in the step shown in FIG. 13F, the Al layer 142 on the back surface of the glass substrate 141 and the Si single-crystal substrate 131 are etched away. In this manner, the $SiO_2$ thermal oxide insulating layer 151 covering a pyramidal conductive projection 152 is exposed.

Figure 14E:
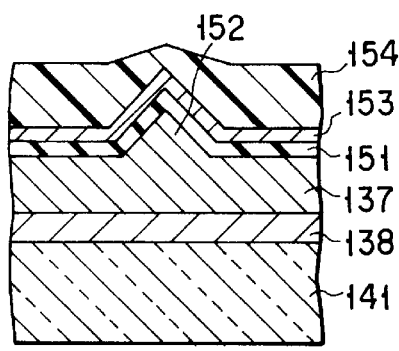

Subsequently, a conductive material layer 153 serving as a gate electrode and made of a conductive material such as W is formed to have a thickness of about 0.5 μm on the insulating layer 151 by sputtering. Thereafter, a photoresist layer 153 is formed by spin coating so as to have a thickness of about 0.9 μm, i.e., a thickness by which the tip of the pyramid is slightly covered (FIG. 14E).

Figure 14F:
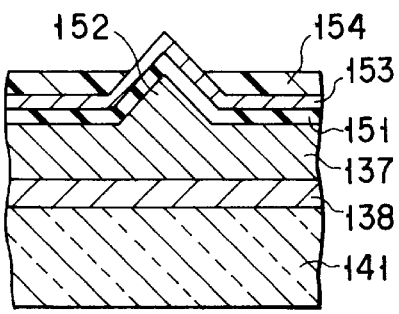
Figure 14G:
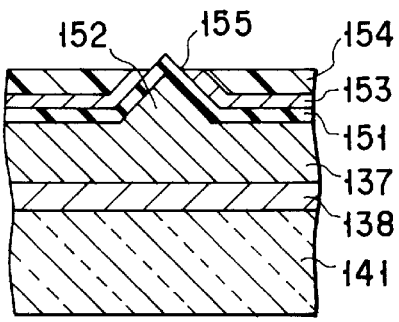

Furthermore, dry etching is performed by using an oxygen plasma to etch away a resist layer 154 so that the pyramid tip is exposed by about 0.7 μm (FIG. 14F). Thereafter, the conductive material layer 153 at the pyramid tip is etched by reactive ion etching to form an aperture 155 (FIG. 14G).

Figure 14H:
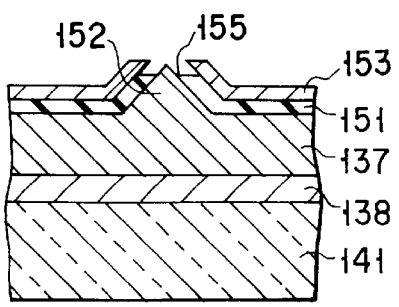

After the resist layer 154 is removed, the insulating layer 151 is selectively removed by using an $NH_4F$—HF solution mixture. In this manner, as shown in FIG. 14H, the carbon nanotubes 136 (not shown) and the conductive projection 152 are exposed in the aperture 155 of the conductive material layer 153 serving as a gate electrode.

In the field emission cold-cathode device shown in FIG. 12 manufactured by the manufacturing method shown in FIGS. 14A to 14H, the conductive projection 118 (indicated by reference numeral 152 in FIGS. 14D to 14H) of the emitter 115 is formed by using the recess 135, which is sharpened by the formation of the $SiO_2$ thermal oxide insulating layer 151, as a mold and therefore succeeds to the pyramidal shape with a pointed tip of the recess 135. A plurality of carbon nanotubes 122 (indicated by reference numeral 136 in FIG. 14A) are supported by the tip of the conductive projection 118 while being partially buried in the conductive projection 118. The gate electrode 128 opposes the conductive projection 118 and the carbon nanotubes 122 with a gap between them.

Figure 15:
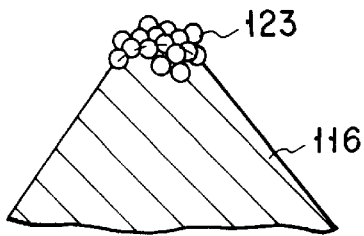
FIG. 15 is an enlarged schematic view showing the tip of a field emission cold-cathode device according to still another embodiment of the present invention.

FIG. 15 is an enlarged schematic view showing the tip of a field emission cold-cathode device according to still another embodiment of the present invention. The characteristic feature of this embodiment is that fullerenes 123 are arranged in place of carbon nanotubes on a conductive projection 118. The structural features and the manufacturing method of the fullerenes 123 are the same as those of the fullerenes 17 described earlier.

The structure shown in FIG. 15 can be applied to either of the field emission cold-cathode devices shown in FIGS. 11A and 12. Also, as the manufacturing methods of these applications, the manufacturing methods shown in FIGS. 13A to 13F and FIGS. 14A to 14H can be essentially directly used. That is, it is only necessary to arrange the fullerenes 123 instead of carbon nanotubes in the steps shown in FIGS. 13C and 14A in which the carbon nanotubes are arranged on the bottom of the recess 135.

Figure 16:
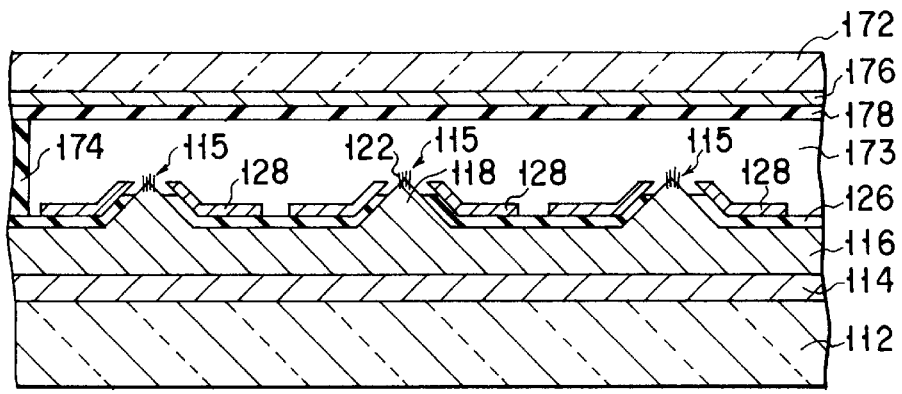
FIG. 16 is a sectional view showing a flat image display device as an example of a vacuum micro device according to still another embodiment of the present invention.
Figure 17A:
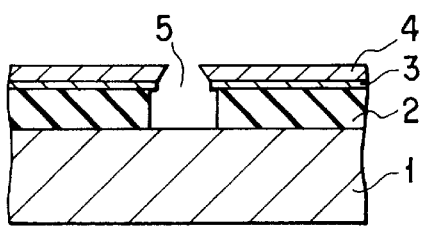
FIGS. 17A to 17C are schematic sectional views showing a conventional field emission cold-cathode device in order of manufacturing steps.
Figure 17B:
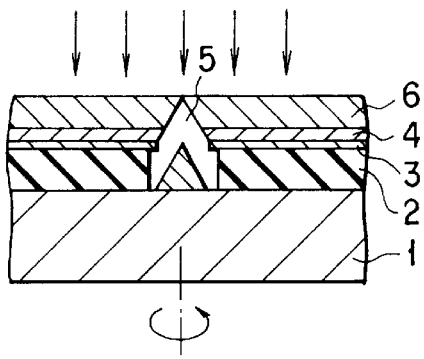
Figure 17C:
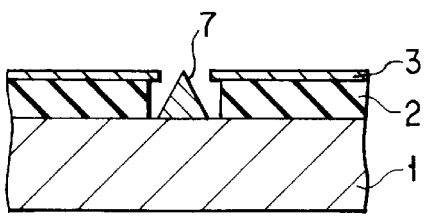

FIG. 16 is a sectional view showing a flat image display device as one example of a vacuum micro device according to still another embodiment of the present invention.

The display device shown in FIG. 16 is formed by using the field emission cold-cathode device shown in FIG. 12. As shown in FIG. 16, a plurality of gate lines constituting gate electrodes 128 are arranged in a direction perpendicular to the drawing surface, and a plurality of cathode lines constituting a cathode interconnecting layer 116 are arranged in a direction parallel to the drawing surface. Emitter groups each including a plurality of emitters 115 are arranged on the cathode lines in a one-to-one correspondence with pixels.

A glass opposing substrate 172 is so disposed as to oppose a glass support substrate 112, and vacuum discharge spaces 173 are formed between the two substrates 112 and 172. The gap between the two substrates 112 and 172 is maintained by peripheral frames and spacers 174. A transparent common electrode or anode electrode 176 and a phosphor layer 178 are formed on the surface of the opposing substrate 172 which opposes the support substrate 112.

In this flat image display device, pixels can be selectively turned on or off by setting an arbitrary voltage between the gate electrode 128 and the emitter 115 at each pixel via the gate line and the cathode line. That is, a pixel can be selected by so-called matrix driving, e.g., by selecting a gate line in a line sequential manner and applying a predetermined potential to the line and, in synchronism with this potential application, applying a predetermined potential as a selection signal to a cathode line.

When a certain gate line and a certain cathode line are selected and respective predetermined potentials are applied to these lines, only an emitter group at the intersection between the gate line and the cathode line operates. Electrons emitted from the emitter group are attracted by a voltage applied to the anode electrode 176 and reach the phosphor layer 178 in a position corresponding to the selected emitter group, thereby making the phosphor layer 178 emit light.

The display device shown in FIG. 16 is formed by using the field emission cold-cathode device shown in FIG. 12. However, a display device can be similarly formed by using another embodiment, e.g., the field emission cold-cathode device having the emitters 115 made up of the fullerenes 123. Further, by using these field emission cold-cathode devices, vacuum micro devices other than display devices, e.g., power converters such as power switching devices can be formed.

In the present invention, emitters are formed by using carbon nanotubes or fullerenes. Therefore, it is possible to provide a field emission cold-cathode device having uniform field emission characteristics, capable of being driven with a low voltage, and also having a high field emission efficiency, and a method of manufacturing the same. The present invention can also provide a field emission cold-cathode device which is readily highly integrated and has a high productivity, and by which a large number of sharp emitters having the same shape can be formed, and a method of manufacturing the same. Especially when carbon nanotubes are used, the aspect ratio of an emitter can be increased.

What is claimed is:

1. A vacuum micro device comprising:
   a support member;
   an emitter formed on said support member to emit electrons, said emitter comprising a fullerene or a carbon nanotube arranged to cause said emitter to emit electrons with an improved field emission efficiency;
   a surrounding member configured to form, together with said support member, a vacuum discharge space surrounding said emitter; and
   an extracting electrode formed to be spaced apart from said emitter, said emitter emitting electrons due to a potential difference between said emitter and said extracting electrode,
   wherein said carbon nanotube is defined by a cylindrical wall formed by winding a graphite sheet, which essentially includes an array of 6-membered rings of carbon, in a direction in which the 6-membered rings has a period substantially of 0.426 nm or 0.738 nm.

2. A device according to claim 1, wherein said emitter comprises a plurality of fullerenes or carbon nanotubes.

3. A device according to claim 1, further comprising a cathode interconnecting layer formed on said support member, wherein said emitter is formed on said cathode interconnecting layer.

4. A device according to claim 3, wherein said cathode interconnecting layer consists essentially of a material selected from the group consisting of Mo, Ta, W, Cr, Ni, and Cu.

5. A device according to claim 1, wherein said emitter comprises a conductive projection supported by said support member, and said fullerene or carbon nanotube is supported by a tip of said conductive projection.

6. A device according to claim 5, wherein said fullerene or carbon nanotube is partially buried in said conductive projection.

7. A device according to claim 5, wherein said conductive projection consists essentially of a material selected from the group consisting of Mo, Ta, W, Cr, Ni, Si, $LaB_6$, AlN, GaN, graphite, and diamond.

8. A device according to claim 1, wherein said support member consists essentially of a synthetic resin.

9. A device according to claim 1, wherein said emitter comprises a plurality of carbon nanotubes, and 70% or more of the carbon nanotubes have a diameter of not more than 30 nm.

10. A device according to claim 1, wherein an end portion of said carbon nanotube is closed with a graphite sheet containing 5-, 6-, and 7-membered rings of carbon.

11. A device according to claim 1, wherein an aspect ratio representing a ratio of a height to a bottom diameter of said carbon nanotube forming said emitter is not less than 3 and not more than $1 \times 10^6$.

12. A device according to claim 11, wherein the aspect ratio is not less than 3 and not more than $1 \times 10^3$.

13. A device according to claim 1, further comprising a conductive filling layer formed in said carbon nanotube and capable of emitting electrons.

14. A device according to claim 13, wherein said filling layer consists essentially of a material selected from the group consisting of Mo, Ta, W, Cr, Ni, Si, $LaB_6$, AlN, GaN, graphite, and diamond.

15. A device according to claim 1, wherein said extracting electrode is a gate electrode supported by said support member.

16. A device according to claim 15, wherein an anode electrode is formed in a position on said surrounding member where said anode electrode opposes said emitter.

17. A device according to claim 1, wherein said extracting electrode is an anode electrode formed in a position on said surrounding member where said anode electrode opposes said emitter.

18. An image display device comprising:

a support member;

an emitter formed on said support member to emit electrons, said emitter comprising a fullerene or a carbon nanotube arranged to cause said emitter to emit electrons with an improved field emission efficiency;

a surrounding member configured to form, together with said support member, a vacuum discharge space surrounding said emitter;

an extracting electrode formed to be spaced apart from said emitter, said emitter emitting electrons due to a potential difference between said emitter and said extracting electrode; and a display portion configured to display an image in accordance with excitation by electrons emitted from said emitter, said display portion being turned on and off under a control of the potential difference between said emitter and said extracting electrode, on which emission of electrons from said emitter depends, wherein said carbon nanotube is defined by a cylindrical wall formed by winding a graphite sheet, which essentially includes an array of 6-membered rings of carbon in a direction in which the 6-membered rings has a period substantially of 0.426 nm or 0.738 nm.

19. The device according to claim 18, wherein said vacuum discharge space contains a substance for emitting light due to excitation by electrons emitted from said emitter.

20. The device according to claim 19, wherein said substance comprises a phosphor.

21. The device according to claim 19, wherein said substance forms a layer arranged at a position facing said emitter.

* * * * *